US009731856B1

(12) United States Patent
Houlihan et al.

(10) Patent No.: US 9,731,856 B1
(45) Date of Patent: Aug. 15, 2017

(54) ROTATABLE TAMP HEAD

(71) Applicant: Amazon Technologies, Inc., Reno, NV (US)

(72) Inventors: Patrick Joseph Houlihan, Phoenix, AZ (US); David Arthur Ogle, II, Bridgeport, TX (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 14/225,966

(22) Filed: Mar. 26, 2014

(51) Int. Cl.
*B32B 41/00* (2006.01)
*B65C 9/42* (2006.01)
*B65C 9/46* (2006.01)

(52) U.S. Cl.
CPC . *B65C 9/42* (2013.01); *B65C 9/46* (2013.01)

(58) Field of Classification Search
CPC .................................... B65C 9/42; B65C 9/46
USPC ......... 156/64, 350, 351, 354, 360, 361, 363, 156/367, 378, 379
See application file for complete search history.

(56) References Cited

U.S. PATENT DOCUMENTS 5,833,803 A * 11/1998 Strohmeyer ............ B65C 1/021 156/256
6,080,250 A * 6/2000 Urban .................. B65C 9/1884 156/360
2014/0347473 A1 11/2014 Wolff et al.

OTHER PUBLICATIONS

Print and Apply CTM Labeling Systems 3600ST All Electric Servo TAMP.wmv, available at http://www.youtube.com/watch?v=-ml-ry2nWTY (published on Jul. 19, 2012).
Legi-Air 5300 Technical Specifications, Bluhm Systeme GmbH (dated Apr. 2008).
Keyence Digital CMOS Laser Sensor GV Series (Copyright 2009).

* cited by examiner

*Primary Examiner* — Michael N Orlando
*Assistant Examiner* — Joshel Rivera
(74) *Attorney, Agent, or Firm* — Athorus, PLLC

(57) ABSTRACT

Printing systems may include a rotatable tamp head that may be repositioned, as necessary, in order to cause a label to be printed in a specific location or in a certain alignment on an object. Such tamp heads may be repositioned as necessary where the label may cross a seam, a crease, a fold or another surface feature which might cause the label to be bowed or damaged in transit. The tamp head may be positioned in a manner that would enable any information, markings or bar codes thereon to remain legible and intact even if the label is applied across such a surface feature.

19 Claims, 10 Drawing Sheets

ROTATABLE TAMP HEAD

BACKGROUND

Items that are delivered to or from a distribution facility, such as a warehouse or fulfillment center, are frequently prepared for delivery in one or more containers (e.g., boxes, envelopes, tubes and the like). Once the items have been packaged in the containers along with an appropriate amount and type of dunnage, and the containers are sealed with one or more adhesive tapes or other like materials, information regarding the containers, e.g., information identifying the contents of the containers, or an intended destination for an order with which the containers are associated, may be affixed or applied to one or more external surfaces thereof, and the containers may be delivered to the intended destination.

Typically, information is affixed or applied to one or more surfaces of a container using a label. Such labels frequently have nominal sizes and may identify an origin (or a sender) of the item, an intended destination (or a recipient) for the item, as well as a number or other identifier that associates the container with one or more orders. The information may be expressed in one or more sets of text or numbers, as well as bar codes or other optically recognizable symbols.

Containers in which items are delivered frequently include one or more seams, creases, edges, folds or other uneven surfaces or surface discontinuities defined by differences in elevations of one or more aspects of such surfaces, such as the flaps or seals of an envelope, or the seam of a folded and assembled box. Where a label applied to a container spans across such surfaces, the label may be subject to wearing and tearing due to changes or variations in the positions or alignment of the surfaces. Moreover, because the preparation, packaging and delivering of containers frequently causes such containers to come into contact with one or more rough surfaces, labels may be subjected to one or more friction-based forces between a time when the labels are affixed or applied to such containers, and a time when such containers arrive at an intended destination. Such changes or variations in the positions or alignments of surfaces, or such friction-based forces, may ultimately render portions of the information expressed on such labels (e.g., text, numbers or identifiers such as bar codes) unreadable by the human eye or one or more automated machines. The inability to interpret the information included on such labels may cause one or more delays in the delivery process, and may increase the cost of delivering the items to their intended destination.

DETAILED DESCRIPTION

As is set forth in greater detail below, the present disclosure is directed to systems for applying a label to an object having rotatable tamp heads with substantially planar application surfaces which permit the labels to be applied to the object in one or more angular orientations based on an alignment of the underlying object. Specifically, the systems and methods disclosed herein are configured to sense and detect an angular orientation of an object, to transfer a label from a label printer or other source to an application surface of a rotatable tamp head, to orient a rotatable tamp head based at least in part on the angular orientation of the object, and to apply a label to the object in an orientation defined by the rotatable tamp head. According to some embodiments disclosed herein, the underlying object may be a container of any type or form, such as a box, a tube, an envelope or the like.

Figure 1A:
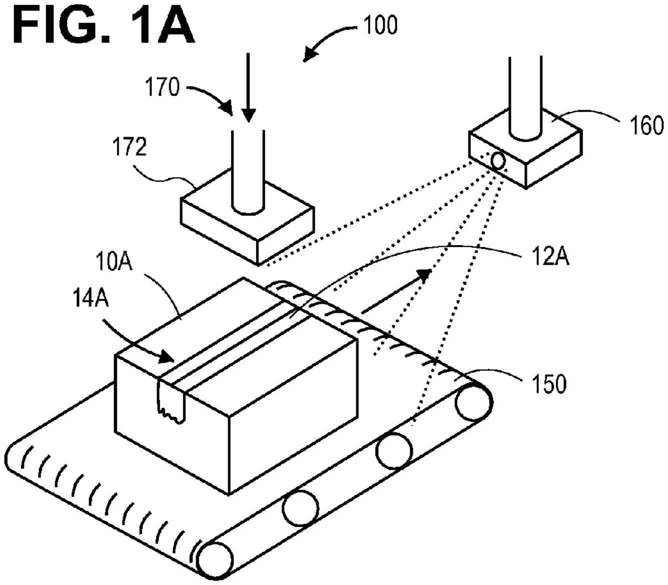
FIGS. 1A, 1B, 1C and 1D show components of one embodiment of a system having a rotatable tamp head, in accordance with embodiments of the present disclosure.

The systems and methods disclosed herein may be implemented in order to apply a label, e.g. a shipping label, to an object, e.g., a container including one or more items therein, in a manner that increases the likelihood that the label will remain readable and intact during a delivery of the object to a destination. Some advantages of the present disclosure are shown with regard to FIGS. 1A, 1B, 1C and 1D. Referring to FIG. 1A, a system 100 including a conveyor 150, a laser sensor 160 and a tamp assembly 170 is shown. The conveyor 150 includes a container 10A traveling thereon. The container 10A includes a seam 12A and an adhesive tape 14A that seals the seam 12A, and the seam 12A and the tape 14A are aligned substantially coaxially with a direction of travel of the container 10A on the conveyor 150. The laser sensor 160 is configured to determine one or more attributes of the container 10A, e.g., a dimension such as a height, a width or a length of the container 10A, the seam 12A or the tape 14A, or an orientation or alignment of the container 10A, the seam 12A or the tape 14A, as the container 10A travels along the conveyor 150. The tamp assembly 170 includes a tamp head 172 for applying one or more labels to containers passing along the conveyor 150.

Figure 1B:
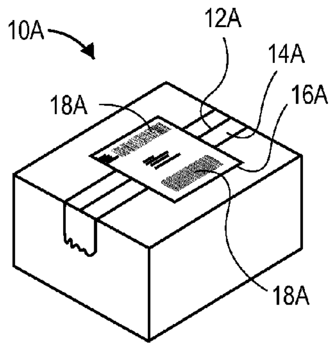

As is shown in FIG. 1A, the container 10A is aligned such that the seam 12A and tape 14A are substantially parallel to or coaxial with a direction of travel of the container 10A along the conveyor 150. The tamp head 172 is further aligned to apply a label in a specific orientation with regard to the seam 12A and the tape 14A. Referring to FIG. 1B, the container 10A is shown having a label 16A applied across the seam 12A and the tape 14A. The label 16A includes a plurality of one-dimensional bar codes 18A that are disposed thereon, with the bar codes 18A aligned in a substantially parallel or coaxial manner with respect to the direction of travel of the container 150, and the seam 12A and tape 14A, while the various lines of the one-dimensional bar codes 18A are aligned in a substantially perpendicular manner with respect to the direction of travel of the container 10A, and the seam 12A and the tape 14A. Thus, even if the label 16A is applied to the container 10A of FIG. 1A in a manner that causes critical portions of the label 16A (e.g., the bar codes 18A) to lie upon the seam 12A, thereby risking bowing, misshaping or other types of damage to the label 14A, the critical portions of the label 14A would remain legible and/or intact.

Figure 1C:
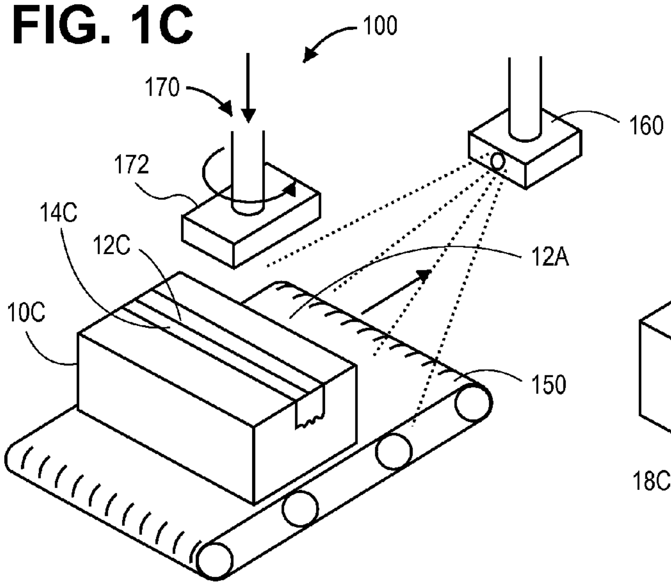

As is discussed above, in accordance with some embodiments of the present disclosure, the tamp head 172 of the system 100 may be rotated in a manner that is consistent with and appropriate for the orientations or alignments of containers passing along the conveyor 150. Referring to FIG. 1C, the system 100 of FIG. 1A is shown with a container 10C traveling along the conveyor 150. The container 10C includes a seam 12C and an adhesive tape 14C that seals the seam 12C, and the seam 12C and the tape 14C are aligned substantially perpendicular to a direction of travel of the container 10C on the conveyor 150. Additionally, as is shown in FIG. 1C, upon sensing the orientation of the container 10C, which is substantially perpendicular to the orientation of the container 10A shown in FIG. 1A, the tamp head 172 has been rotated by a predetermined angle of approximately ninety degrees (90°), as compared to the alignment of the tamp head 172 shown in FIG. 1A. The alignment of the tamp head 172 as shown in FIG. 1C enables labels to be applied to the container 10C in an orientation that is perpendicular to the orientation of the labels applied by the tamp head 172 to the container 10A by when the system 100 is configured as is shown in FIG. 1A.

Figure 1D:
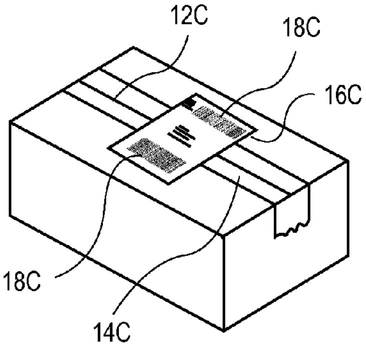

Referring to FIG. 1D, the container 10C is shown having a label 16C applied across the seam 12C and the tape 14C. The label 16C includes a plurality of one-dimensional bar codes 18C that are disposed thereon, with the bar codes 18C aligned in a substantially perpendicular manner with respect to the direction of travel of the container 150, and the seam 12C and tape 14C, while the various lines of the one-dimensional bar codes 18C are aligned in a substantially parallel or coaxial manner with respect to the direction of travel of the container 150, and the seam 12C and the tape 14C. Accordingly, as with the orientation of the label 16A as is shown in FIG. 1B, even if the label 16C is applied to the container 10C of FIG. 1C in a manner that causes critical portions of the label 16C (e.g., the bar codes 18A) to lie upon the seam 12A, thereby risking bowing, misshaping or other types of damage to the label 14A, the critical portions of the label 14A would remain legible and/or intact.

As is discussed above, and in greater detail below, items that are received, handled or sent by way of a distribution facility may be packed for delivery in one or more containers. Some such containers may include, but are not limited to, preconfigured envelopes or bags, as well as boxes, cartons, tubes, crates or drums. When one or more items have been packed into a container, the container may be sealed by one or more means, including tapes, glues, seals or other flexible or rigid adhesives. For example, when preparing a box for delivery, a single layer of cardboard may be joined at a pair of opposite ends, and a section having a square, rectangular or other suitable shape may be defined from the joined layer. Next, four tabs may be cut from each of the free ends of the section, and the four tabs at each of the free ends may be folded to form a box that defines a rectangular hollow. After one or more items has been placed into the box, along with one or more suitable layers of dunnage, the folded tabs of the box may be closed and sealed using one or more layers of tape or other sufficiently durable adhesive sealant, and a label (e.g., a shipping label or an address label) including information regarding the box or the items included therein may be affixed to one or more external surfaces of the box.

The process of applying a label to a sealed box or other container may be performed at high rates of speed using systems including one or more conveyors. According to some such systems, a sealed container may be caused to travel by way of a moving conveyor system, and an application system may cause a tamp head having a label associated therewith to come into contact with the sealed container, thereby pressing an adhesive surface of the label onto an external surface of the sealed container. In this regard, some such systems are capable of applying labels to dozens of containers each minute.

Despite the speed and relative ease with which labels may be applied to containers that are in motion on one or more conveyors, however, occasionally such labels may be applied in a manner that renders them unreadable by humans or machines, e.g., scanners or readers that are configured to interpret text, numbers or bar codes, which are optical machine-readable representations in the form of parallel lines (viz., a one-dimensional bar code) or shapes or symbols (viz., a two-dimensional bar code) with varying widths and spacings. For example, where a label including a bar code is applied across a seam, an edge or a crease of a container, or another surface discontinuity or difference in elevation, the label may bow or otherwise be misshaped by the underlying surface of the container. A bowed or misshaped label may be distorted or torn, thereby causing portions of the label to be hidden or unrecognizable. In particular, where the lines of a one-dimensional bar code are aligned in parallel with a seam, an edge or a crease of a container, or another surface discontinuity or difference in elevation, a bowing or misshaping of a label including the one-dimensional bar code may cause the obliteration of one or more of the parallel lines, thereby precluding the bar code from being interpreted. Similarly, where the shapes or symbols of a two-dimensional bar code have dimensions that are similar to or smaller than a dimension of a seam, an edge or a crease, a bowing or misshaping of a label that includes the two-dimensional bar code may obscure one or more such shapes or symbols, and also render the bar code unreadable. Such effects may be exacerbated in a distribution environment, where such containers may be aggressively handled or processed by equipment or workers, thereby causing further compression or damage to some or all of such labels.

Additionally, where labels are applied to containers in orientations that are inconsistent with the respective alignments of the containers, some or all of the information on such labels may be obscured from view, damaged or otherwise illegible. For example, where a label having dimensions of four inches by six inches (4"×6") is to be applied to a substantially rectangularly shaped container having dimensions of five inches by seven inches (5"×7"), the label will be properly applied if the long and short dimensions of the label are respectively aligned with the long and short dimensions of the container, e.g., where the label and the container are each aligned in a lengthwise manner. Conversely, where the long and short dimensions of the label are aligned with the short and long dimensions of the container, e.g., where the container is aligned lengthwise and the label is aligned crosswise, some or all of the end portions of the label in the long (or six inch) dimension may extend beyond the surface area of the container in the short (or five inch) dimension. In this regard, any information expressed in such end portions may be torn or deemed illegible during the delivery process.

Despite the fact that a seam, an edge, a crease or another surface feature, surface discontinuity or difference in elevation may comprise a largely insignificant portion of a surface area of a container, the application of a label across such features using traditional tamp heads and assemblies may cause increases in costs or delays associated with the delivery of the container to which the label has been applied. For example, where a label affixed to a container is damaged or otherwise may not be interpreted, the container may require relabeling or a manual rerouting. The costs or delays associated with relabeling containers, or for manually rerouting such containers, may be substantial.

Prior efforts to address the impacts of the mislabeling of containers have been ineffective. For example, containers such as boxes or envelopes may not easily be rotated or turned in a uniform manner, or positioned such that a tamp head or tamp assembly may consistently applied to such boxes or envelopes, which may further be twisted, rolled or otherwise repositioned in transit. Similarly, efforts to realign printers or print heads prior to printing labels for application by tamp heads or tamp assemblies are also ineffective, given the unpredictable positions or orientations of the boxes or containers that are to be labeled.

The systems and methods of the present disclosure are directed to applying labels to objects, such as containers, using rotatable tamp heads and/or tamp assembly components that may be aligned in one or more orientations within a plane based on a sensed orientation of the objects to which such labels are to be applied. Orientations and/or attributes of such objects may be identified and evaluated by any known sensing means, including but not limited to scales, optical readers or other optical sensors (e.g., laser sensors), upon an entry of an object into a label zone or other region associated with the tamp assembly.

In this regard, a tamp head may be rotated or otherwise aligned by a predetermined angle (e.g., ninety degrees), or a customized angle, and in a manner that causes a label to be effectively applied or affixed to an object, and enhances the probability that the information rendered within the label may be subsequently read or interpreted. For example, where a label includes one or more sets of text, numbers or bar codes, the tamp head may rotate in order to cause the label to be applied to an object in a location or orientation that is more preferable or advantageous, e.g., in a manner that avoids any seams, edges, creases or other features, or otherwise enables such sets of text, numbers or bar codes to be interpreted even if the label is applied across one or more such features. The rotatable tamp heads and tamp assemblies disclosed herein may be used in connection with an assembly-line type operation or process that comprising one or more conveyors or other like apparatuses or stations, and seamlessly integrated or incorporated into such operations or processes.

Figure 2:
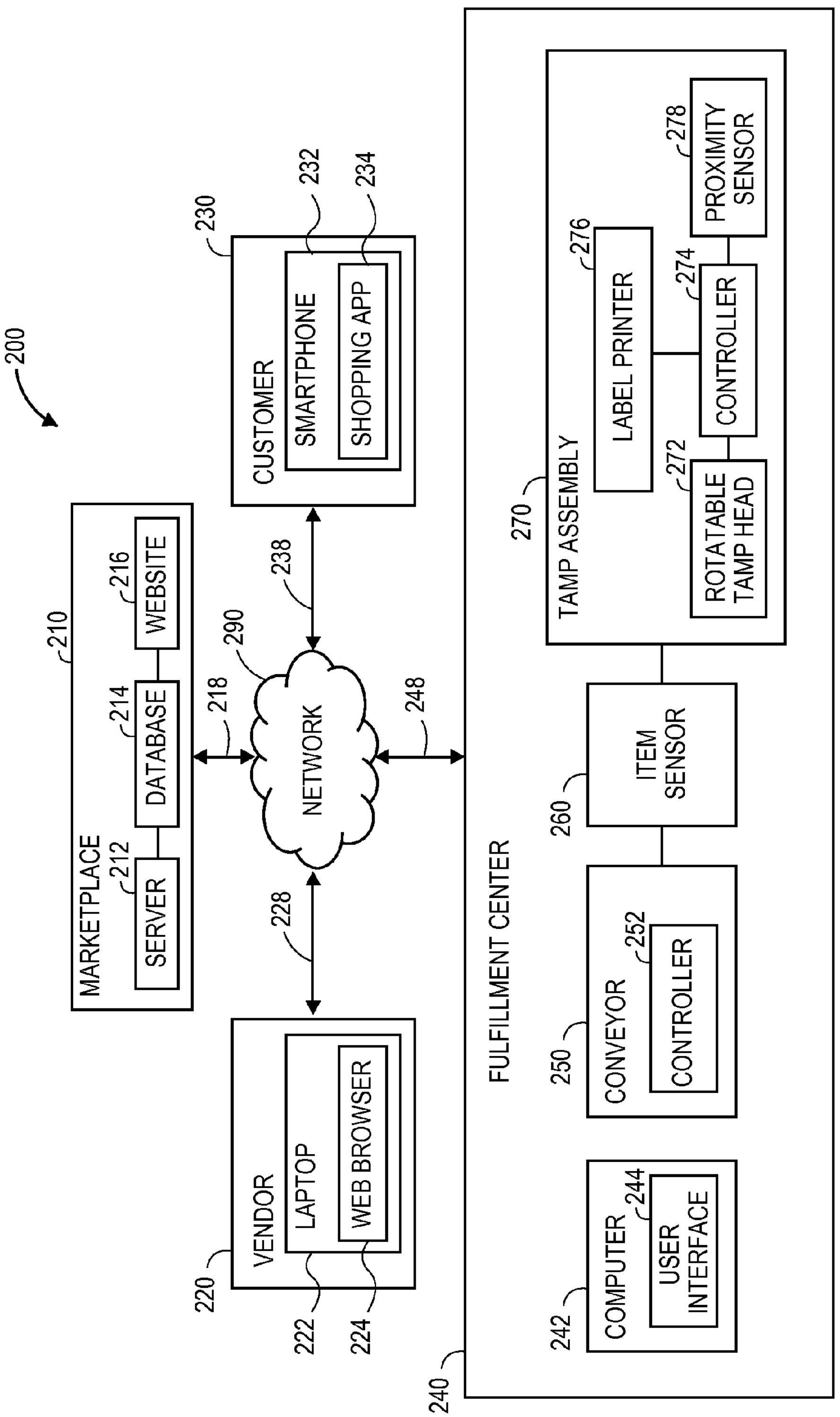
FIG. 2 is a block diagram of components of one embodiment of a system having a rotatable tamp head, in accordance with embodiments of the present disclosure.

Referring to FIG. 2, a block diagram of components of a system 200 having a rotatable tamp head in accordance with the present disclosure are shown. Except where otherwise noted, reference numerals preceded by the number "2" shown in FIG. 2 indicate components or features that are similar to components or features having reference numerals preceded by the number "1" shown in FIG. 1.

As is shown in FIG. 2, the system 200 includes a marketplace 210, a vendor 220, a customer 230 and a fulfillment center 240 that are connected to one another across a network 290, such as the Internet.

The marketplace 210 may be any entity or individual that wishes to make items from a variety of sources available for download, purchase, rent, lease or borrowing by customers using a networked computer infrastructure, including one or more physical computer servers 212 and databases 214 for hosting a web site 216. The marketplace 210 may be physically or virtually associated with one or more storage or distribution facilities, such as the fulfillment center 240. The web site 216 may be implemented using the one or more servers 212, which connect or otherwise communicate with the one or more databases 214 as well as the network 290, as indicated by line 218, through the sending and receiving of digital data. Moreover, the database 214 may include any type of information regarding items that have been made available for sale through the marketplace 210, or ordered by customers from the marketplace 210.

The vendor 220 may be any entity or individual that wishes to make one or more items available to customers, such as the customer 230, at the marketplace 210. The vendor 220 may operate one or more order processing and/or communication systems using a computing device such as a laptop computer 222 and/or software applications such as a web browser 224, which may be implemented through one or more computing machines that may be connected to the network 290, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 240. Additionally, the vendor 220 may receive one or more items from other vendors, manufacturers or sellers (not shown), and may deliver one or more of such items to locations designated by the marketplace 210, such as the fulfillment center 240, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The customer 230 may be any entity or individual that wishes to download, purchase, rent, lease, borrow or otherwise obtain items (which may include goods, products, services or information of any type or form) from the marketplace 210. The customer 230 may utilize one or more computing devices, such as a smartphone 232 or any other like machine that may operate or access one or more software applications 234 or web browsers, and may be connected to or otherwise communicate with the marketplace 210, the vendor 220 or the fulfillment center 240 through the network 290, as indicated by line 238, by the transmission and receipt of digital data. Moreover, the customer 230 may also receive deliveries or shipments of one or items from facilities maintained by or on behalf of the marketplace 210, such as the fulfillment center 240, by way of a truck or other like carrier.

The fulfillment center 240 may be a facility that is adapted to receive, store, process and/or distribute items on behalf of the marketplace 210. As is shown in FIG. 2, the fulfillment center 240 may operate one or more order processing and/or communication systems using a computing device such as a computer 242 and/or software applications having one or more user interfaces 244 (e.g., a web browser), or through one or more other computing machines that may be connected to the network 290, as is indicated by line 248, in order to transmit or receive information in the form of digital or analog data, or for any other purpose. The computer 242 may also operate or provide access to one or more reporting systems for receiving or displaying information or data regarding workflow operations, and may provide one or more interfaces, such as the user interface 244, for receiving interactions (e.g., text, numeric entries or selections) from one or more operators, users or workers in response to such information or data. The computer 242 may further operate or provide access to one or more engines for analyzing the information or data regarding the workflow operations, or the interactions received from the one or more operators, users or workers.

The fulfillment center 240 may include any apparatuses that may be required in order to receive shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned or unmanned aircraft, such as drones), and preparing such items for storage or distribution to customers. The fulfillment center 240 may also include one or more predefined two-dimensional or three-dimensional spaces for accommodating items and/or containers of such items, such as shelves, bins, lockers, cubbies or any other appropriate areas or spaces. The fulfillment center 240 may further include one or more areas, spaces or stations where items that have been retrieved from a designated storage area may be evaluated, prepared and packed for delivery to addresses, locations or destinations specified by customers.

The fulfillment center 240 may further include one or more control systems that may generate instructions for conducting operations at one or more stations therein, which may be associated with the computer 242 or one or more other computing machines, and may communicate with the marketplace 210, the vendor 220 or the customer 230 over the network, as indicated by line 248, through the sending and receiving of digital data. Such control systems may have one or more computers, servers and/or devices featuring the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein.

The fulfillment center 240 may also include one or more workers or staff members, e.g., pickers or sorters, may handle or transport items within the fulfillment center 240, such as by removing the items from an item carrier, placing the items onto a crane, jack, belt or another conveying apparatus, transporting the items to a shelf, bin, rack, tier, bar, hook or other storage means, retrieving the items from such a storage means, transporting the items to a defined space, preparing the items for delivery to one or more customers, and placing the items onto an item carrier. According to one embodiment, workers may also transport, or "cross-dock," items received at the fulfillment center 240 for immediate distribution. Moreover, workers may also operate one or more computing devices for registering the receipt, retrieval, transportation or storage of items within the fulfillment center, such as devices that are specifically programmed or adapted for such purposes, or a general purpose device such a personal digital assistant, a digital media player, a smartphone, a tablet computer or a laptop computer, and may include any form of input and/or output peripherals such as scanners, readers, keyboards, keypads, touchscreens or pointing devices, e.g., in order to register their possession of an item at any time.

The fulfillment center 240 may further include a conveyor 250, an item sensor 260 and a tamp assembly 270. The conveyor 250 comprise any component or system for transporting objects, items or materials of varying sizes and shapes, and may include any number of machines or elements for causing the motion or translation of such objects, items or materials from one location to another. The machines or elements that cause or enable such motion or translation may be driven by any form of mover, including belts, chains, screws, tracks or rollers, and the objects, items or materials may be transported in a container or carrier, or on or within the mover itself. A conveyor system may further include one or more pulleys, shafts, hubs, bushings, sprockets, bearings and other elements for causing a movement of the conveyor. Further, a conveyor system may convey objects, items or materials into one or more static or dynamic apparatuses, such as a bin, a chute, a cart, a truck or another like machine. As is shown in FIG. 2, the conveyor 250 further includes a controller for causing or controlling the operation of one or more components of the conveyor 250, and thereby causing the motion or the translation of objects thereon from one location to another.

For example, the conveyor 250 may commonly include a conveyor belt, viz., a banded continuous-loop belt (e.g., rubber or fabric) that is placed into motion by a series of two or more pulleys, at least one of which is driven by a motor that may be controlled using the controller 252. Objects, items or materials may be placed directly onto the belt, or into one or more bins or like containers that may be placed on the belt. Similarly, the conveyor 250 may commonly include a chain conveyor having one or more pendants, which may be used to pull unit loads on pallets or in other large-scale containers. The conveyor 250 may also include a gravity conveyor, which may consist of a series of rollers that may be used to move objects based on a difference in height, and a resulting difference in gravitational potential energy, without the use of a motor.

The fulfillment center 240 may further include one or more item sensors 260, which may consist of or comprise one or more sensors, including but not limited to a scale or other device for determining a mass of one or more objects, a depth sensor or range camera for determining a distance to the one or more objects (e.g., a laser sensor); a digital camera or other imaging device for capturing still or moving images or multimedia regarding the one or more objects. For example, the scale may be aligned to weigh or otherwise determine a mass of the one or more objects passing along the conveyor 250. The depth sensor or range camera may be aligned to determine depth data or ranging data, e.g., a distance or depth to one or more faces or facets of an object. Some such devices may include infrared projectors for projecting infrared light onto one or more surfaces of an object and infrared sensors including arrays of pixel detectors for capturing digital imaging data regarding the wavelengths of the reflected light within different spectral bands, such as relatively lower frequency bands associated with infrared light, which may be projected upon an object in order to determine information regarding a distance to the object from which such light is reflected, or an orientation or configuration of the object. For example, the reflected light within the infrared bands may be processed in order to recognize a distance to the object, as well as one or more dimensions (e.g., heights, widths or lengths) of the object.

Additionally, the digital camera or other imaging device may be a digital area-scan or line-scan camera configured to capture light reflected from objects, in order to calculate or assign one or more quantitative values of the reflected light, and to generate one or more outputs based on such values, or to store such values in one or more data stores. Such devices may detect reflected light within their respective fields of view, which may be defined by a function of a distance between a sensor and a lens within the camera (viz., a focal length), as well as a location of the camera and an angular orientation of the camera's lens. Additionally, where an object appears within a depth of field, or a distance within the field of view where the clarity and focus is sufficiently sharp, a digital camera may capture light that is reflected off objects of any kind to a sufficiently high degree of resolution using one or more sensors thereof, and store information regarding the reflected light in one or more data files. Moreover, those of ordinary skill in the pertinent arts would further recognize that one or more of such item sensors 260 may be combined into a single sensor. For example, one such device is an RGB-Z sensor, which may capture not only color-based imaging information regarding an object (e.g., colors of pixels in an image of the object, expressed according to the RGB color model) but also information regarding distances from the object (e.g., a depth or a range z to the object).

As is shown in FIG. 2, the fulfillment center 240 also includes the tamp assembly 270, which further includes a rotatable tamp head 272, a controller 274, a label printer 276 and a proximity sensor 278, which may operate independently or in conjunction with one another, at the instruction of the computer 242 or one or more other computers or computer devices. The rotatable tamp head 272 may be any component having a suitable surface for receiving a label to be affixed upon an object, contacting the object and disposing the label upon the object. Additionally, the controller 274 may be any form of actuator or motorized component for raising or lowering, or otherwise repositioning, e.g., rotating, an application surface of the rotatable tamp head 272 within a plane or about one or more axes. The controller 274 may cause the rotatable tamp head 272 to be raised, lowered or rotated using any form of prime mover, and may include one or more actuators which cause the rotatable tamp head 272 to press or roll a label into a surface of an object (e.g., a flat surface and/or cylinder), wrap a label around a corner or edge of an object, or "blow" or otherwise apply a label onto an object by way of fluid pressure in accordance with the present disclosure. Moreover, the rotatable tamp head 272 may further include any device or component for holding a label onto the rotatable tamp head 272 prior to applying the label to an object, including one or more vacuum or adhesive systems.

The rotatable tamp head 272 may take any shape or any size. For example, the rotatable tamp head 272 may have an application surface having a size consistent with a size of a label to be applied thereby, i.e., an area of approximately four inches by six inches (4"×6") where the tamp assembly 270 is to be used to apply a four inch by six inch (4"×6") label, or an object to which the label is to be applied. The rotatable tamp head 272 may also be chamfered, shaped or otherwise modified to correspond to any system requirements, however. Additionally, one or more rotatable tamp heads 272 may be releasably mounted within the tamp assembly 270 and interchangeably provided for use with labels or objects of various sizes, or in connection with various applications.

The label printer 276 may be any form of analog or digital printer, e.g., a toner-based, inkjet, solid ink, inkless, dot-matrix or daisy wheel printer, configured to impose one or more characters, symbols or other markings onto a label or other adhesive paper-type product. The label printer 276 may be configured to operate separately or in conjunction with the rotatable tamp head 272, and may include various label supply facilities such as rolls, trays or carriages which may provide blank stock to the label printer 276 for printing. The label printer 276 may be further connected to or otherwise associated with one or more computer devices, such as a direct or networked connection with the computer 242 or a networked connection with any other computer device outside the fulfillment center 240, and may receive one or more commands to print instructions or data onto a predetermined label of a selected type or form. Moreover, the label printer 276 may be used to print labels for various applications. For example, a label printer 276 may be configured to print shipping labels onto one or more containers of an outbound shipment that is being prepared for delivery from the fulfillment center 240 to a customer 230, while also printing labels onto one or more containers of an inbound shipment arriving at the fulfillment center 240 from the vendor 220. Additionally, the label printer 276 may further include one or more components for transferring a printed label to the rotatable tamp head 272 for application onto one or more objects.

The proximity sensor 276 is provided to determine a proximity between the rotatable tamp head 272 and an object onto which a label is to be applied or affixed. The proximity sensor 276 may operate according to any known principles for determining the presence of one or more objects nearby. For example, the proximity sensor 276 may emit one or more beams of electromagnetic radiation (e.g., infrared radiation) and detect the effects of any reflections of such radiation from one or more objects, in order to determine when an object is sufficiently close to an application surface of the rotatable tamp head 272. Additionally, the proximity sensor 276 may be an inductive sensor, a Hall effect sensor, a capacitive sensor or any other type or kind of sensor that may be selected based at least in part on the type of object that is intended to be sensed. Moreover, those of ordinary skill in the pertinent art would recognize that the proximity sensor 276 may comprise two or more sensors of the same or different types.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "customer" or a "fulfillment center" may be automated steps performed by their respective computer systems, or implemented within software modules (or computer programs) executed by one or more general purpose computers. Moreover, process steps described as being performed by a "marketplace," a "vendor," a "customer" or a "fulfillment center" may be typically performed by a human operator, e.g., via the server 212, the laptop computer 222, the smartphone 232 or the computer 242, but could, alternatively, be performed by an automated agent.

The vendor 220, the customer 230 and/or the fulfillment center 240 may use any web-enabled or Internet applications or features, such as the web browser 224, the shopping application 234 or the user interface 244, or any other client-server applications or features including electronic mail (or E-mail), or other messaging techniques, to connect to the network 290 or to communicate with one another, such as through short or multimedia messaging service (SMS or MMS) text messages. For example, in addition to the laptop computer 222, the smartphone 232 or the computer 242, those of ordinary skill in the pertinent art would recognize that the vendor 220, the customer 230 or the fulfillment center 240 may operate any of a number of computing devices that are capable of communicating over the network 290, including but not limited to set-top boxes, personal digital assistants, digital media players, web pads, laptop computers, tablet computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers, such as the laptop computer 222, the smartphone 232, the computer 242 or any computers or control systems utilized by the marketplace 210, the vendor 220, the customer 240 or the fulfillment center 240 and having sequences of instructions which, when executed by a processor (such as a central processing unit, or CPU), cause the processor to perform all or a portion of the functions, services and/or methods described herein. Such computer executable instructions, programs, software and the like may be loaded into the memory of one or more computers using a drive mechanism associated with the computer-readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

For the purposes of illustration, some of the systems and methods disclosed herein may be referenced primarily in the context of systems and methods for applying or affixing labels to containers in a fulfillment center environment using one or more rotatable tamp heads, such the system 100 of FIGS. 1A, 1B, 1C and 1D. As will be recognized by those of skill in the art, however, the systems and methods disclosed herein may also be used in many other environments, and their utility is not limited to any of the preferred embodiments described herein.

Figure 3:
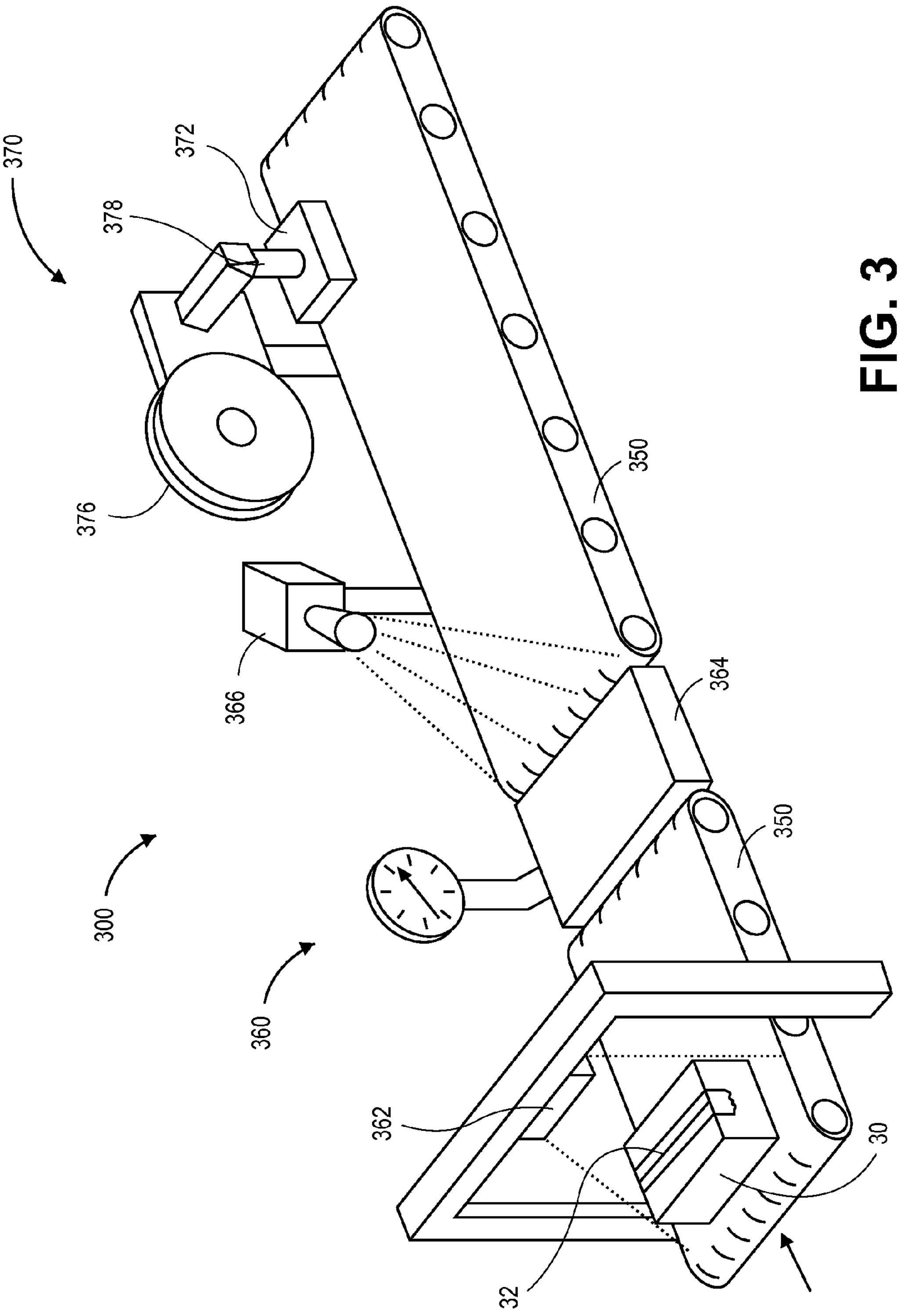
FIG. 3 shows components of one embodiment of a system having a rotatable tamp head, in accordance with embodiments of the present disclosure.

As is discussed above, a tamp assembly having a rotatable tamp head may be incorporated into any industrial or commercial system or process that requires or desires the printing of labels onto one or more objects. Referring to FIG. 3, one system 300 having a rotatable tamp head in accordance with embodiments of the present disclosure is shown. Except where otherwise noted, reference numerals preceded by the number "3" in FIG. 3 indicate components or features that are similar to components or features having reference numerals preceded by the number "2" in FIG. 2, or by the number "1" shown in FIGS. 1A-1D.

The system 300 shown in FIG. 3 includes a pair of conveyors 350, 352, a plurality of sensors 360 and a tamp assembly 370 provided for applying or affixing one or more labels to a container 30. The plurality of sensors 360 includes a depth sensor or range camera 362 (e.g., a laser sensor) oriented to capture dimensional information or any other attributes regarding the container 30, the seam 32 or any markings or other identifiers on the container 30 or the seam 32, as the container 30 passes thereunder, a scale 364 for determining a mass of the container 30 and an imaging device 366 (e.g., a digital camera) for capturing imaging information in the form of digital images and/or range data from objects passing along the conveyors 350, 352, such as the container 30. The tamp assembly of FIG. 3 includes a rotatable tamp head 372, a label printer 376 and a proximity sensor 378.

In accordance with the present disclosure, the system 300 may be employed to apply or affix one or more labels to containers using the rotatable tamp head 372. For example, as the container 30 passes beneath the depth sensor 362, dimensional information such as lengths, widths or heights of the container 30 may be determined, and based at least in part on such information, areas of one or more surfaces of the container 30, as well as a volume of the container 30, may be estimated. Additionally, as the container 30 passes along the scale 364, a mass of the container 30 may be determined, and as the container 30 passes in view of the imaging device 366, images or other information regarding the container 30 may be captured.

Based at least in part on the dimensional information, the mass and/or the imaging information obtained using the depth sensor 362, the scale 364 and the imaging device 366, the container 30 may be identified, and an orientation or alignment of the container 30 may be determined. For example, referring again to the system 300 of FIG. 3, the information gathered using one or more of the plurality of sensors 360 may be analyzed or interpreted in order to recognize that the container 30 includes a seam 32 and is aligned substantially perpendicular or transverse to a direction of travel along the conveyors 350, 352, or that the seam 32 is also aligned in a similar manner.

Once the container 30 has been identified, and an orientation of the container 30 has been determined, an appropriate label to be applied upon a surface of the container may be printed using the label printer 376, and transferred to an application surface (viz., an underlying surface) of the rotatable tamp head 372. Next, the orientation of the rotatable tamp head 372 is compared to the orientation of the container 30. If the orientation of the rotatable tamp head 372 is sufficient for applying or affixing the printed label to the container 30 in a manner that will likely cause the information disposed upon the printed label to remain readable and intact during the fulfillment process, i.e., such that any characters or bar codes included on the printed label will likely remain legible regardless of whether the label is applied or affixed to the container 30 across the seam 32, then when the proximity sensor 378 senses the presence of the container 30 within a vicinity thereof, the application surface of the rotatable tamp head 372 may be pressed onto a surface of the container 30, thereby applying or affixing the printed label to the container 30.

If, however, the orientation of the rotatable tamp head 372 is not adequate for applying or affixing the printed label to the container 30 in a manner that will likely cause the information disposed upon the printed label to remain readable and intact during the fulfillment process, the rotatable tamp head 372 may be rotated within a plane or about an axis by an amount or to an extent that would enable the printed label to be applied or affixed in a preferred manner. For example, as is discussed above, where portions of a label, such as characters, lines of a one-dimensional bar code or shapes or symbols of a two-dimensional bar code disposed upon the label, would be applied atop one or more seams, creases, edges, folds or other uneven surfaces, surface discontinuities or differences in elevation of the container, the rotatable tamp head 372 may be repositioned in a perpendicular manner that may enable such characters or bar codes to be readable despite being applied atop such surfaces, discontinuities or differences in elevation. The rotatable tamp heads of the present disclosure may be rotated in any manner and to any extent that would cause a label applied thereby to be placed in a location and/or in an orientation that is preferable to the location or the orientation in which the label would be applied in the absence of or without any such rotation.

Figure 4:
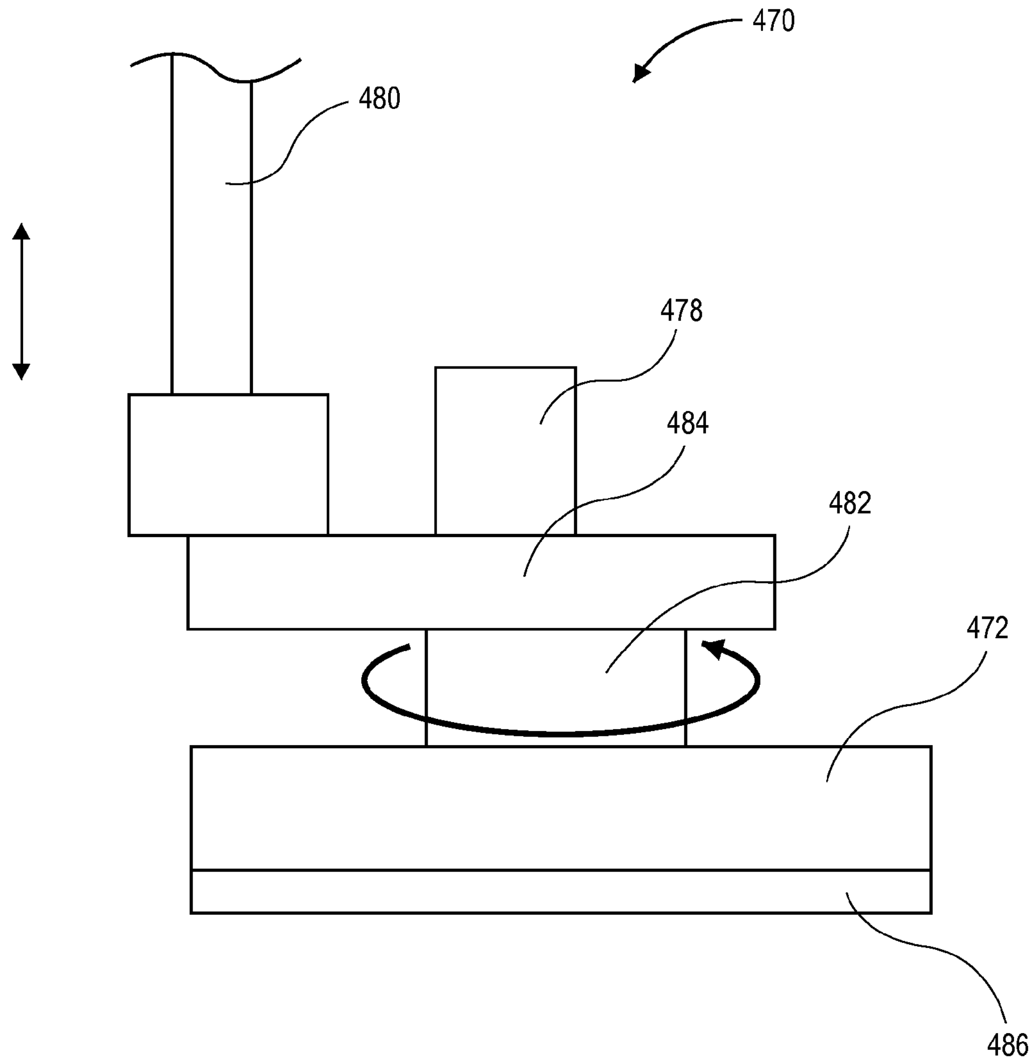
FIG. 4 shows components of one embodiment of a system having a rotatable tamp head, in accordance with embodiments of the present disclosure.

Referring to FIG. 4, a side view of portions of one tamp assembly 470 is shown. Except where otherwise noted, reference numerals preceded by the number "4" in FIG. 4 indicate components or features that are similar to components or features having reference numerals preceded by the number "3" in FIG. 3, by the number "2" in FIG. 2, or by the number "1" shown in FIGS. 1A-1D.

As is shown in FIG. 4, the tamp head assembly 470 includes a rotatable tamp head 472, a proximity sensor 478, a cylinder mount 480, an actuator 482, an actuator mount 484 and an application head 486. The cylinder mount 480 may cause the rotatable tamp head 472 to be raised or lowered, as desired, in order to cause the rotatable tamp head 472 to be placed into contact with a container passing thereunder, such as is shown in FIG. 3. The actuator 482 is mounted to the actuator mount 484 and may cause the rotatable tamp head 472 to be rotated within a plane, as desired, and at the command of a controller or other control system, in order to appropriately orient the rotatable tamp head 472 with respect to an orientation of an object, such as a container. Additionally, the actuator 482 may include one or more synchronous or asynchronous electric motors for rotating the rotatable tamp head 472 within the plane that may operate using alternating current (AC) or direct current (DC) power obtained from any source (not shown).

The proximity sensor 478 may sense any form of contact between the rotatable tamp head 472, or a portion thereof, with a surface of an underlying object. The proximity sensor 478 may further include any buffer pad or layer between the proximity sensor 478 and the actuator mount 484, or between the actuator 482 and the actuator mount 484, that permits the rotatable tamp head 472 to give or recoil upon making contact with a surface of an underlying object. Such a buffer pad may be formed of a suitable substance, e.g., a sufficiently compressible layer of rubber, plastic or like materials, that may accommodate a response to contact with the underlying object and return to form once the contact is removed.

The application head 486 may provide a preferred type or form of surface or barrier between the rotatable tamp head 472 and an underlying object, and for holding a label in place prior to application to the underlying object. For example, the application head 486 may be formed from one or more plastics or urethanes, such as polyoxymethylene or another synthetic polymer or polymer resin. A printed label to be applied to an object may be transferred to the application head 486 by any means, e.g., a vacuum-holding device or any other form of adhesive system.

Figure 5A:
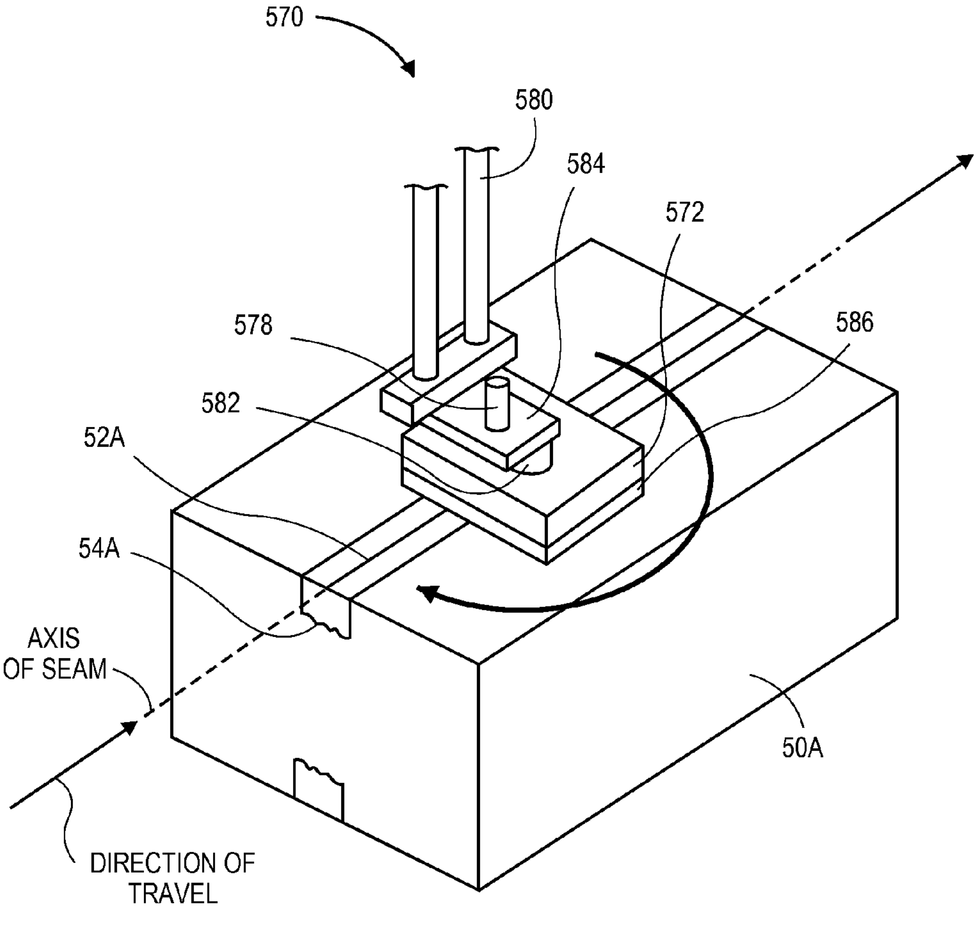
FIGS. 5A and 5B show components of one embodiment of a system having a rotatable tamp head, in accordance with embodiments of the present disclosure.
Figure 5B:
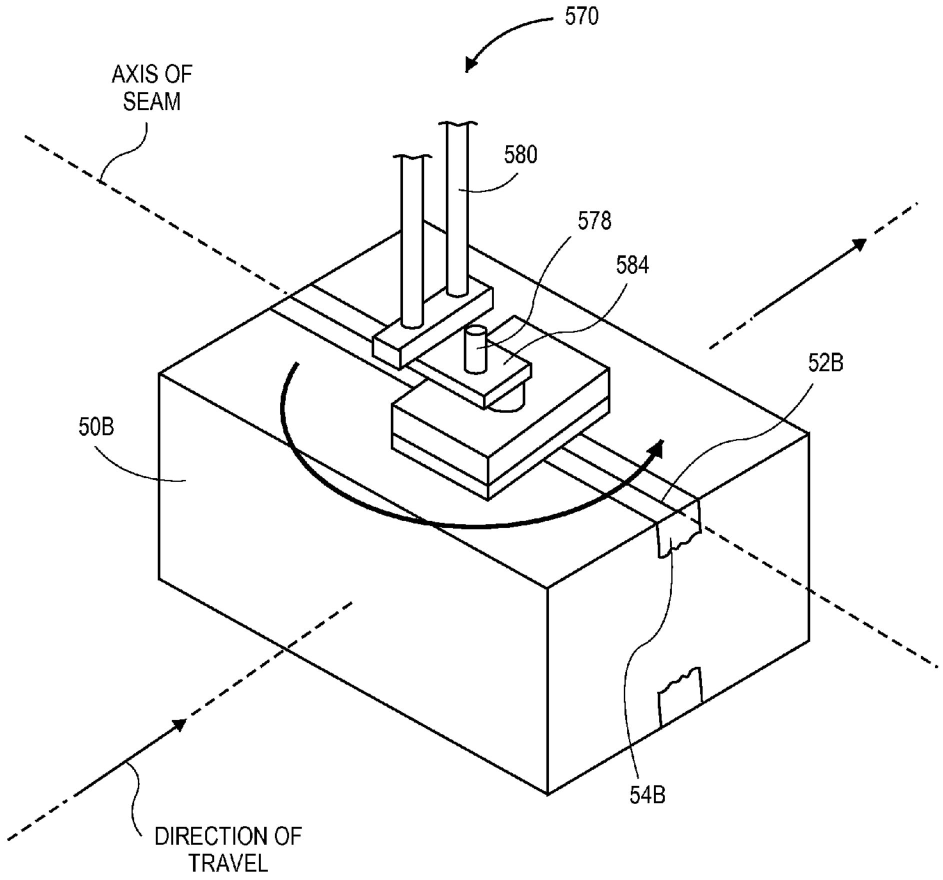

The operation of tamp assemblies having rotatable tamp heads in accordance with the present disclosure may be shown with regard to FIGS. 5A and 5B. Except where otherwise noted, reference numerals preceded by the number "5" in FIG. 5A or FIG. 5B indicate components or features that are similar to components or features having reference numerals preceded by the number "4" in FIG. 4, by the number "3" in FIG. 3, by the number "2" in FIG. 2, or by the number "1" shown in FIGS. 1A-1D.

Referring to FIG. 5A, a tamp assembly 570 is shown applying a label to a surface of a container 50A having a seam 52A and an adhesive tape 54A applied thereon. The tamp assembly 570 includes a rotatable tamp head 572, a proximity sensor 578, a pair of cylinder mounts 580, an actuator 582 and an actuator mount 584. The rotatable tamp head 572 further includes an application head 586 to which a label may be transferred prior to contacting the container 50A. Additionally, an axis of the seam 52A is substantially coaxial with or parallel to a direction of travel of the container 50A.

As is shown in FIG. 5A, once an axis of the seam 12A is determined with regard to a direction of travel of the container 50A, e.g., upon the conveyor 150 of the system 100 of FIGS. 1A and 1C, the systems and methods of the present disclosure may determine whether an orientation of the rotatable tamp head 572 is appropriate for ensuring that information provided on a label applied to the container 50A has a sufficiently high probability of remaining readable and intact, even if the label is applied across one or more uneven surfaces associated with the seam 52A and the tape 54A.

As is discussed above, however, the actuator 582 may cause the rotatable tamp head 572 to be reoriented within a plane or about an axis, as necessary, in order to cause a label to be applied to a surface of a container in a desired manner with respect to an orientation of the container. Referring to FIG. 5B, the tamp assembly 570 of FIG. 5A is shown applying a label to a surface of a container 50B having a seam 52B and an adhesive tape 54B applied thereon. As is shown in FIG. 5B, an axis of the seam 52B is substantially perpendicular to a direction of travel of the container 50B. For this reason, the tamp assembly 570 of FIG. 5B is configured such that the orientation of the rotatable tamp head 572 as shown in FIG. 5B is substantially perpendicular to the orientation of the rotatable tamp head 572 as shown in FIG. 5A.

Therefore, as is shown in FIGS. 5A and 5B, the systems and methods of the present disclosure may reorient a rotatable tamp head, as necessary, in a manner that is consistent with an orientation of an underlying object (e.g., a container), to enhance the likelihood that the rotatable tamp head will properly apply or affix a label to the underlying object. Once information regarding a surface feature (e.g., the axes of the seams 52A, 52B of FIGS. 5A and 5B) of the underlying object is determined, an appropriate orientation of the rotatable tamp head may be selected accordingly. A printed label may then be transferred to the rotatable tamp head and applied or affixed to the underlying object with confidence that characters or identifiers such as bar codes will remain readable and intact regardless of whether such characters or such identifiers are placed above or atop the surface features, surface discontinuities or differences in elevation.

Figure 6A:
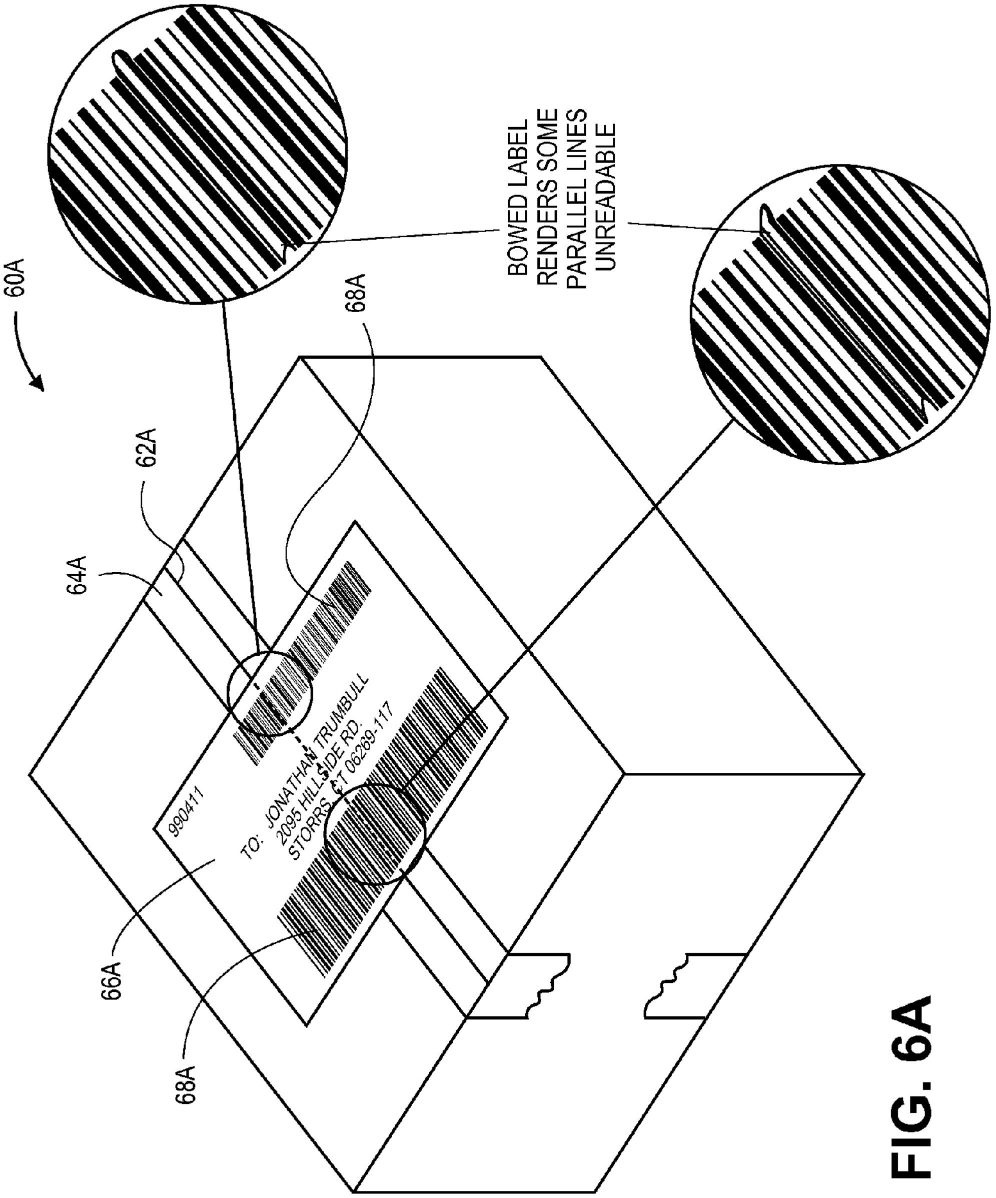
FIGS. 6A and 6B show components of one embodiment of a system having a rotatable tamp head, in accordance with embodiments of the present disclosure.
Figure 6B:
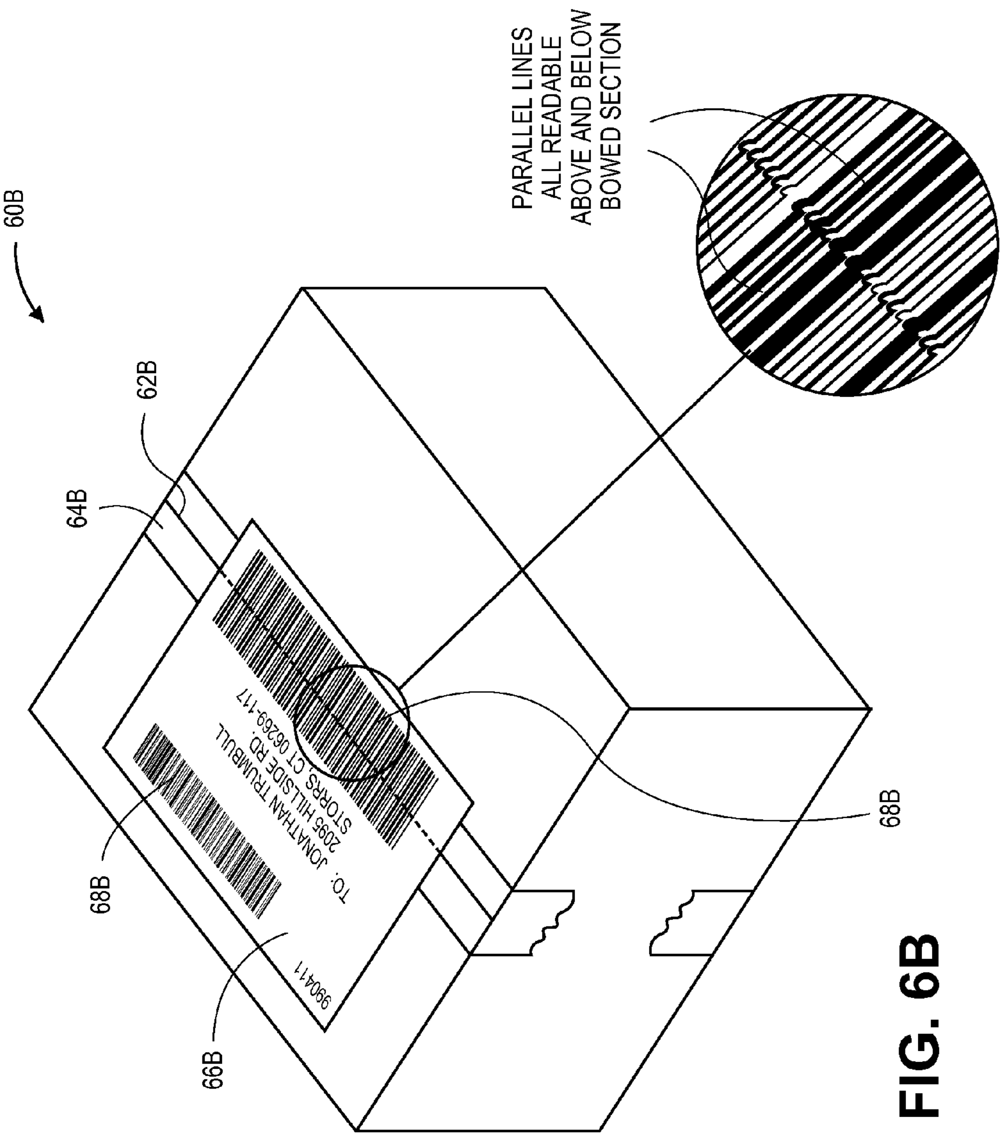

Some advantages of the present disclosure are shown with regard to the containers 60A, 60B of FIGS. 6A and 6B. Except where otherwise noted, reference numerals preceded by the number "6" in FIG. 6A or FIG. 6B indicate components or features that are similar to components or features having reference numerals preceded by the number "5" in FIG. 5A or FIG. 5B, by the number "4" in FIG. 4, by the number "3" in FIG. 3, by the number "2" in FIG. 2, or by the number "1" shown in FIGS. 1A-1D.

As is shown in FIG. 6A, a container 60A has a seam 62A and a layer 64A of adhesive tape applied thereon. Additionally, the container 60A further includes a label 66A having a pair of one-dimensional bar codes 68A. The label 66A is applied across the seam 62A and the layer 64A, such that portions of the bar codes 68A are substantially co-aligned with the seam 62A. Because a one-dimensional bar code is a representation of data encoded in the form of varying widths and spaces of parallel lines that may be read using a light source for transmitting light beams or other optical impulses upon the bar code, and a light sensor for capturing light reflected from the bar code, or through one or more photogrammetric analyses of an image of the bar code, the placement of the label 66A across the seam 62A as shown in FIG. 6A may render the bar codes 68A unreadable, as the bowing or misshaping of the label 66A across the seam may remove, damage or modify one or more of the corresponding parallel lines. The systems and methods of the present disclosure may address this condition through the use of a rotatable tamp head when applying labels to such containers. By recognizing an axis or orientation of a seam or other surface feature, surface discontinuity or difference in elevation of an object based on attributes that may be captured from the object using one or more sensors, an appropriate orientation of the rotatable tamp head may be determined prior to applying or affixing a label to the object.

Referring to FIG. 6B, a container 60B has a seam 62B and a layer 64B of adhesive tape applied thereon. The container 60B further includes a label having a pair of one-dimensional bar codes 68B. As is shown in FIG. 6B, one of the bar codes 68B is applied across the seam 62B and layer 64B. However, because the parallel lines of the one of the bar codes 68B are perpendicular to the axis of the seam 62B, the bar code 68B may still be evaluated using a standard bar code reader or through a photogrammetric analysis of an image of the bar code 68B, as the encoded representation of data remains intact.

Figure 7:
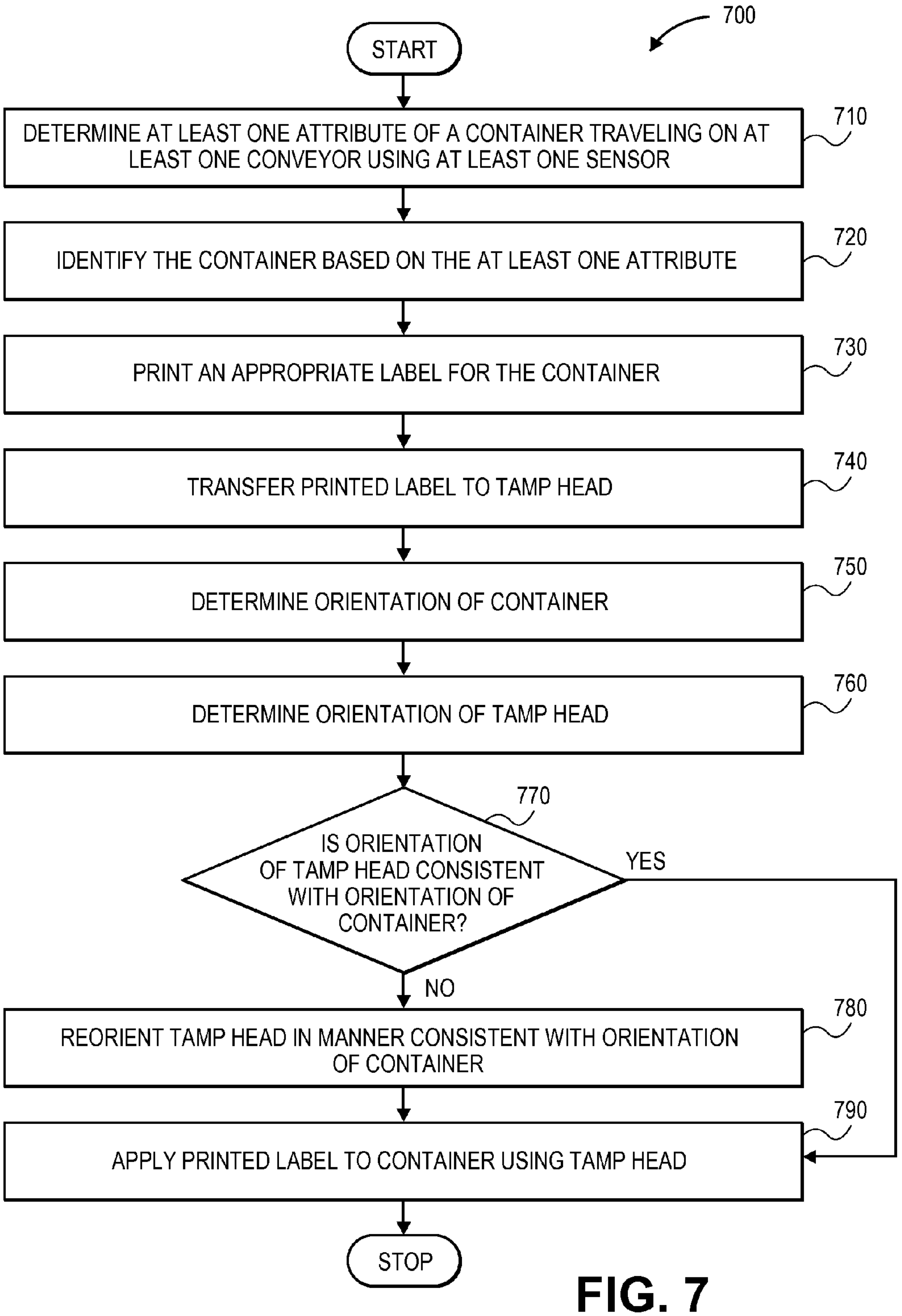
FIG. 7 is a flow chart of one method for labeling items using a system having a rotatable tamp head, in accordance with embodiments of the present disclosure.

Accordingly, the rotatable tamp heads disclosed herein may be used to avoid the labeling results shown with regard to the container 60A of FIG. 6A, and to achieve the labeling results shown with regard to the container 60B of FIG. 6B, in one or more processes. Referring to FIG. 7, a flow chart 700 of one method for labeling items using a system having a rotatable tamp head in accordance with embodiments of the present disclosure is shown. At box 710, at least one attribute of a container traveling on at least one conveyor is determined using at least one sensor. For example, referring again to the system 300 shown in FIG. 3, a height, length, width or any other dimension of the container 30 may be determined using the depth sensor 362, while a mass of the container 30 may be determined using the scale, and dimensions or other identifying information, including a location or alignment of one or more marked identifiers (e.g., characters or bar codes) as well as any seams, creases, edges, folds or other uneven surfaces, surface discontinuities or differences in elevation of surfaces of the container 30 may be determined using the imaging device 366.

At box 720, the container may be identified based at least in part on the attributes determined using the at least one sensor, and at box 730, an appropriate label for the container is printed. For example, referring again to FIG. 3, the dimensions, the mass or any other information determined from the plurality of sensors 360 may be compared to registry or list of information regarding a plurality of containers, and, when the container 30 is identified based on such a comparison, a label for the container 30 may be printed using the label printer 376. At box 740, the label may be transferred to a tamp head. For example, referring to FIG. 4, the label may be transferred to the application head 486 and held in place using a vacuum or other means.

At box 750, an orientation of the container is determined, and at box 760, an orientation of the tamp head is determined. The orientation of the container may be determined using the same attributes that were determined at box 710, or any other information, such as that may be accessed once the container is identified at box 720, or in any other manner. For example, the orientation may be determined through a photogrammetric analysis of one or more images of the container 30 of FIG. 3 captured using the imaging device 366, or based on one or more dimensions determined using the depth sensor 362. At box 760, an orientation of the tamp head is determined, e.g., by identifying a position of one or more rotatable components associated with the tamp assembly 470 of FIG. 4, such as the actuator 482, or the tamp head 472 itself, or by any other means.

At box 770, whether the orientation of the tamp head is consistent with the orientation of container is determined, e.g., in a qualitative or quantitative manner and by any means. For example, a probability or likelihood that a label applied by the tamp head in the orientation determined at box 760 will be sufficiently applied to a container having the orientation determined at box 750 may be estimated. Alternatively, an angular difference between the orientation of the tamp head determined at box 750 and an optimal orientation of the tamp head may be calculated and compared to one or more thresholds or tolerances.

If the orientation of the tamp head is consistent with the orientation of the container, e.g., if the tamp head would cause a label 66B to be applied to a container 60B as is shown in FIG. 6B, then the process advances to box 790, where the printed label is applied to the container using the tamp head.

However, if the orientation of the tamp head is not consistent with the orientation of the container, then the process advances to box 780, where the tamp head is reoriented in a manner consistent with the orientation of the container, and to box 790, where the printed label is applied to the container using the tamp head. For example, referring again to FIG. 6A or 6B, where the orientation of the tamp head determined at box 760 would cause an application of the label 66A to the container 60A as is shown in FIG. 6A, thereby causing the label to be damaged or rendered otherwise unreadable, the tamp head may be rotated or otherwise reoriented to cause an application of the label 66B to the container 60B as is shown in FIG. 6B, such that the characters or identifiers included thereon would be readable even if the label 66B is applied across a seam 62B.

Accordingly, the orientation of a tamp head may be modified, as necessary, where a label applied by a tamp head to an object (e.g., a container or one or more items) in a specific orientation would be at risk of damage or unreadability, the tamp head may be reoriented prior to applying the tamp head to the object to a particular orientation which may enhance the likelihood that the label would be undamaged or remain readable during or following an industrial or commercial process.

Figure 8:
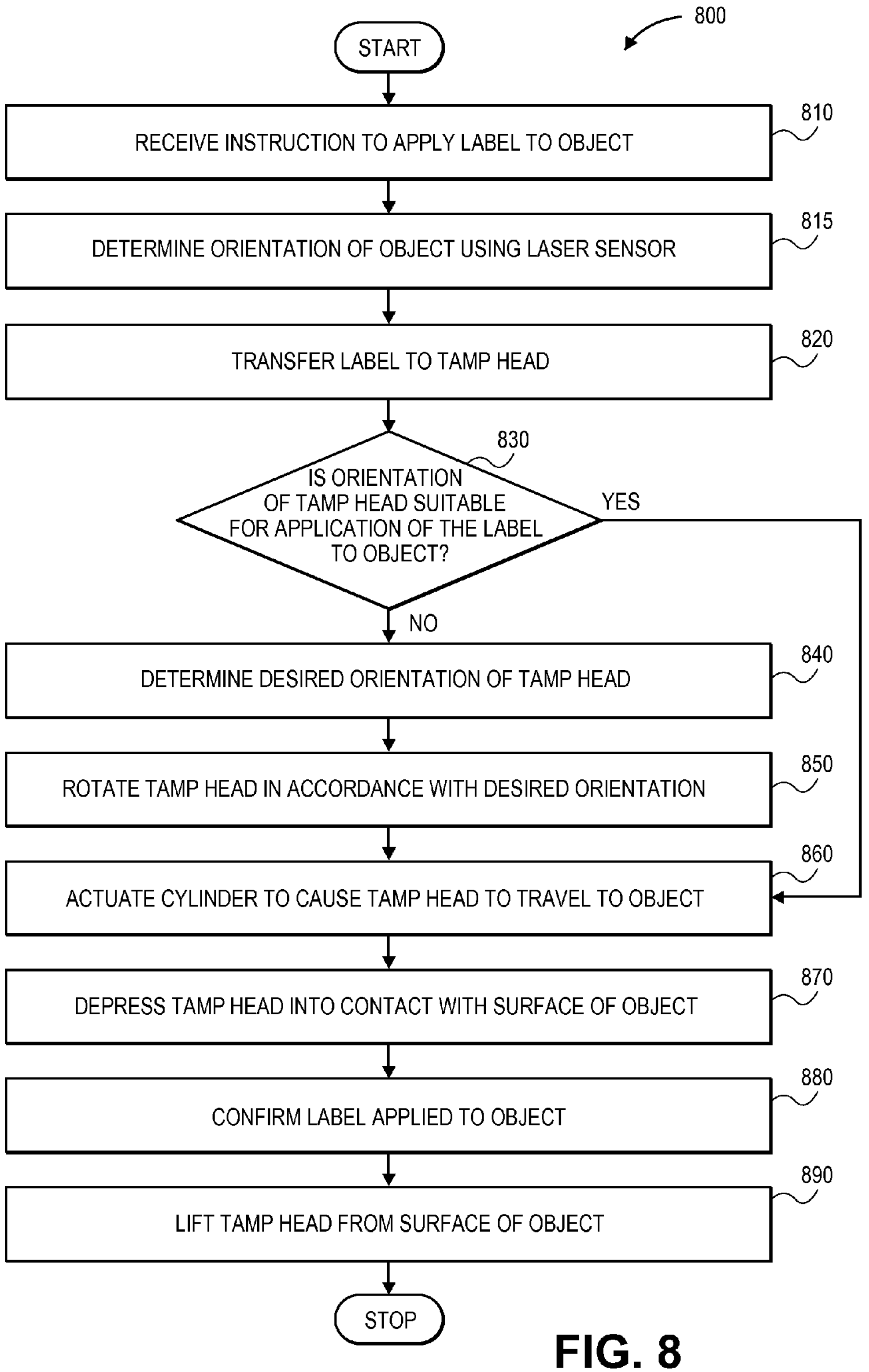
FIG. 8 is a flow chart of one method for labeling items using a system having a rotatable tamp head, in accordance with embodiments of the present disclosure.

As is discussed above, a label may be applied using a rotatable tamp head in accordance with the present disclosure using any form of machines or apparatuses, such as those shown in connection with the system 300 of FIG. 3, or using one or more of the components of the rotatable tamp heads 470, 570 of FIGS. 4, 5A and 5B. An extent to which a tamp head orientation is believed to result in the damage or unreadability of a label applied thereby, or an extent to which the tamp head is to be reoriented, may be determined by any means and on any basis. Referring to FIG. 8, a flow chart 700 of one method for labeling items using a system having a rotatable tamp head in accordance with embodiments of the present disclosure is shown. At box 810, instructions to apply a label to an object are received. For example, the controller 252 of the conveyor 250 and/or the controller 274 of the tamp assembly 270 of FIG. 2 may receive an instruction directly from the computer 242, or from one or more external computer devices by way of the network 290, to label a specific item, container or other object with a printed label.

At box 815, an orientation of the object is determined using a laser sensor. For example, referring to the system 100 of FIGS. 1A and 1B, or the system 300 of FIG. 3, the sensors 160, 366 may determine an orientation or alignment of various aspects of the containers 10A, 10B, 30, including an orientation of specific aspects of such containers 10A, 10B, 30, e.g., one or more seams, creases, edges, folds or other uneven surfaces, surface discontinuities or differences in elevation of the containers, or general orientations of the containers 10A, 10B, 30 themselves with respect to the conveyors 150, 350 or any other element. Those of ordinary skill in the pertinent arts will recognize that any type or form of sensor, including but not limited to laser sensors, may be provided for the purpose of determining an orientation of the object, or any other attribute regarding the object. At 820, a label is transferred to a tamp head.

At box 830, whether the orientation of the tamp head is suitable for an application of the label to the object is determined. If the orientation is unsuitable, then the process advances to box 840, where a desired orientation of the tamp head is determined, and to box 850, where the tamp head is rotated in accordance with the desired orientation. For example, where a seam, an edge, a crease, a fold or another uneven surface feature of the object would be aligned in parallel with the tamp head in its current orientation, then an alternate orientation for printing a label onto the object, e.g., an amount or extent by which the tamp head may be rotated within a plane in order to cause such seams, edges, creases, folds or uneven surface features in a different or preferred alignment with respect to the tamp head may be identified and implemented. The desired orientation of the tamp head may be calculated or identified with respect to the current orientation of the tamp head, e.g., a relative angular difference with respect to the current orientation, or with regard to an absolute or universal orientation in free space, e.g., a defined heading or angular orientation.

If the orientation of the tamp head is suitable for application to the object at box 830, or following the rotation of the tamp head in accordance with the desired rotation at box 850, the process advances to box 860, where a cylinder is actuated in order to cause the tamp head to travel toward the object. Referring again to FIG. 4, the cylinder mount 480 may manipulate, lower or otherwise position the rotatable tamp head 472 in a position that would cause the rotatable tamp head 472 to be placed into contact with a container passing thereunder. At box 880, the application of a label upon the object is confirmed by any means, such as by using one or more of the proximity sensors 378, 478, 578 shown in FIG. 3, 4, 5A or 5B, which may confirm a sufficiently close distance between the rotating tamp head and a surface of the object. At box 890, the tamp head is lifted from the surface of the object, and the process ends.

Accordingly, the systems and methods of the present disclosure may be used to determine an appropriate orientation of a tamp head for applying a label to an object, such as a container, based at least in part on the positions or orientations of the object and/or one or more seams, edges, creases, folds or uneven surface features thereon, and may reorient the tamp head, as necessary, in order to properly affix the label to the object in a manner that is most likely to render the label readable and intact.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use a substantially rectangular tamp head, or a tamp head that may be raised and lowered or caused to rotate by a rotatable actuator, the systems and methods are not so limited. Those of ordinary skill in the pertinent arts would recognize that a tamp head may be fixed in position with regard to a rotatable shaft that may be itself raised and lowered, as necessary, in order to apply or affix a label upon an object using the tamp head. Additionally, the systems and methods disclosed herein may be implemented to apply pre-printed labels, and need not be associated with a label printer or other printing device.

Moreover, although some of the embodiments described herein include specific systems or methods for conveying objects (e.g., containers), or for sensing information regarding such an object, the systems and methods of the present disclosure are not so limited, and may be used with any means or method for conveying any form or type of object, or determining information regarding such an object. Additionally, such means or methods may be used in series or in parallel, and independently or in conjunction with one another, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 7 or 8, the order in which the steps of the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although the invention has been described and illustrated with respect to exemplary embodiments thereof, the foregoing and various other additions and omissions may be made therein and thereto without departing from the spirit and scope of the present disclosure.

What is claimed is:

1. A method for labeling an object comprising:

determining a first orientation of a surface discontinuity within at least a portion of a surface of the object using at least one sensor;

determining a second orientation of a tamp head within a plane;

associating a label with the tamp head;

determining whether the first orientation is consistent with the second orientation; and in response to determining that the first orientation is not consistent with the second orientation, causing a rotation of the tamp head to a third orientation within the plane; and contacting the label onto the portion of the surface of the object using the tamp head in the third orientation.

2. The method of claim 1, further comprising:

in response to determining that the first orientation is consistent with the second orientation, contacting the label onto the portion of the surface of the object using the tamp head in the second orientation.

3. The method of claim 1, wherein the object is a container, and wherein the surface discontinuity is one of a seam within the portion of the surface of the container, a crease within the portion of the surface of the container or a fold within the portion of the surface of the container.

4. The method of claim 1, wherein a difference between the second orientation of the tamp head and the third orientation of the tamp head is a predetermined angle within the plane.

5. The method of claim 1, wherein the tamp head is mounted to a rotatable actuator, and wherein causing the rotation of the tamp head to the third orientation within the plane comprises:

determining an angular difference between the second orientation within the plane and the third orientation within the plane; and causing the rotatable actuator to rotate to an extent defined based at least in part on the angular difference.

6. The method of claim 1, wherein the tamp head comprises an application surface, and wherein the tamp head is configured to receive the label on the application surface of the tamp head and to transfer the label from the application surface of the tamp head to the portion of the surface of the object.

7. The method of claim 1, wherein the at least one sensor is at least one of a depth sensor, a scale or a digital camera, and wherein determining the first orientation of the surface discontinuity within at least the portion of the surface of the object comprises:

determining at least one attribute of the object using the at least one sensor; and determining the first orientation of the surface discontinuity within at least the portion of the surface of the object based at least in part on the at least one attribute.

8. The method of claim 1, further comprising:

confirming contact of the label onto the portion of the surface of the object.

9. The method of claim 1, further comprising:

causing the object to travel on at least one conveyor, wherein the at least one sensor is configured to determine the first orientation as the object travels on the at least one conveyor.

10. The method of claim 1, wherein the label comprises a marked identifier, and wherein the method further comprises:

selecting the third orientation based at least in part on the marked identifier.

11. The method of claim 10, wherein the marked identifier comprises at least one of:

a set of characters corresponding to an origin of the object;

a set of characters corresponding to a destination for the object; or at least one bar code.

12. A labeling system comprising:

a conveyor;

at least one sensor configured to obtain information regarding an object on the conveyor;

a rotatable tamp head comprising a substantially planar application surface;

a controller configured to cause the rotatable tamp head to rotate within a plane; and a computer processor configured to at least:

determine a first orientation of a surface discontinuity within a surface of the object on the conveyor based at least in part on the information regarding the object on the conveyor;

determine a second orientation of the rotatable tamp head within the plane;

cause at least one label to be placed on the substantially planar application surface;

determine whether the first orientation is consistent with the second orientation; and in response to determining that the first orientation is not consistent with the second orientation, cause the controller to rotate the rotatable tamp head to a third orientation within the plane; and cause the at least one label to contact the surface of the object with the rotatable tamp head in the third orientation within the plane.

13. The labeling system of claim 12, wherein the computer processor is further configured to at least:

in response to determining that the first orientation is consistent with the second orientation, cause the at least one label to contact the surface of the object with the rotatable tamp head in the second orientation within the plane.

14. The labeling system of claim 12, further comprising a printer, wherein the computer processor is further configured to at least:

determine information regarding a destination for the object on the conveyor; and cause the printer to print at least some of the information regarding the destination for the object on the conveyor on the at least one label prior to causing the at least one label to be placed on the substantially planar application surface.

15. The labeling system of claim 12, wherein the information regarding the object comprises at least one of a location of a surface discontinuity on the surface of the object or an alignment of the surface discontinuity on the surface of the object.

16. The labeling system of claim 12, wherein the at least one sensor is at least one of:

a scale configured to determine a mass of the object on the conveyor;

a depth sensor configured to determine a dimension of the object on the conveyor; or an imaging device configured to capture imaging information from the object on the conveyor, wherein the information regarding the object comprises at least one of the mass of the object, the dimension of the object or the imaging information from the object.

17. A computer-implemented method comprising:

recognizing a container traveling along a conveyor;

identifying information to be applied to the container;

causing at least some of the information to be printed onto a label;

transferring the label to an application surface of a tamp head;

identifying a surface discontinuity within at least one surface of the container;

determining a first orientation of a portion of the surface discontinuity within the at least one surface of the container using at least one sensor;

determining a second orientation of the information printed onto the label on the tamp head;

determining whether the first orientation is consistent with the second orientation;

in response to determining that the first orientation is not consistent with the second orientation, rotating the tamp head by a predetermined amount within a plane;

pressing the tamp head onto the at least one surface of the container; and causing the label to be applied to the at least one surface of the container.

18. The computer-implemented method of claim 17, further comprising:

in response to determining that the first orientation is consistent with the second orientation, pressing the tamp head onto the at least one surface of the container; and causing the label to be applied to the at least one surface of the container.

19. The computer-implemented method of claim 17, further comprising:

confirming an application of the label to the at least one surface of the container.

* * * * *